United States Patent [19]

Chitayat

[11] Patent Number: 5,334,892
[45] Date of Patent: Aug. 2, 1994

[54] POSITIONING DEVICE FOR PLANAR POSITIONING

[75] Inventor: Anwar Chitayat, Northport, N.Y.
[73] Assignee: Anorad Corporation, Northport, N.Y.
[21] Appl. No.: 995,589
[22] Filed: Dec. 22, 1992
[51] Int. Cl.[5] ............................................ H02K 41/00
[52] U.S. Cl. ........................................... 310/12; 74/89
[58] Field of Search .................... 74/24, 25, 26, 27, 88, 74/89; 310/12

[56] References Cited

U.S. PATENT DOCUMENTS 3,376,578 4/1968 Sawyer ............................ 310/13 X
4,667,139 5/1987 Hirai et al. ............................ 318/687

Primary Examiner—Emanuel T. Voeltz
Assistant Examiner—Judson H. Jones
Attorney, Agent, or Firm—Herbert F. Ruschmann; Thomas R. Morrison

[57] ABSTRACT

A positioning device has a shuttle slidably and rotatably supported above a base assembly. A first linear motor moves the shuttle linearly in a first direction while the second and third linear motors move the shuttle linearly in a second direction, normal to the first direction. The second and third linear motors are separated along an axis in the first direction. The linear motors have magnetic arrays including rows of magnets or a checkerboard array of magnets and provide continuously variable positioning. Rotary movement of the shuttle is achieved by operating the second and third linear motors in opposing directions or at differing rates. The positions of three points on the shuttle are determined by three optical encoders, or three interferometers, whose signals provide feedback to a controller which actuates the linear motors accordingly. The controller employs an algorithm for the translation of the three point positions into shuttle position and orientation information and for implementing a closed loop control system whereby the shuttle may be positioned with respect to a reference point, torque thereupon may be compensated for, and the shuttle may be rotated.

31 Claims, 8 Drawing Sheets

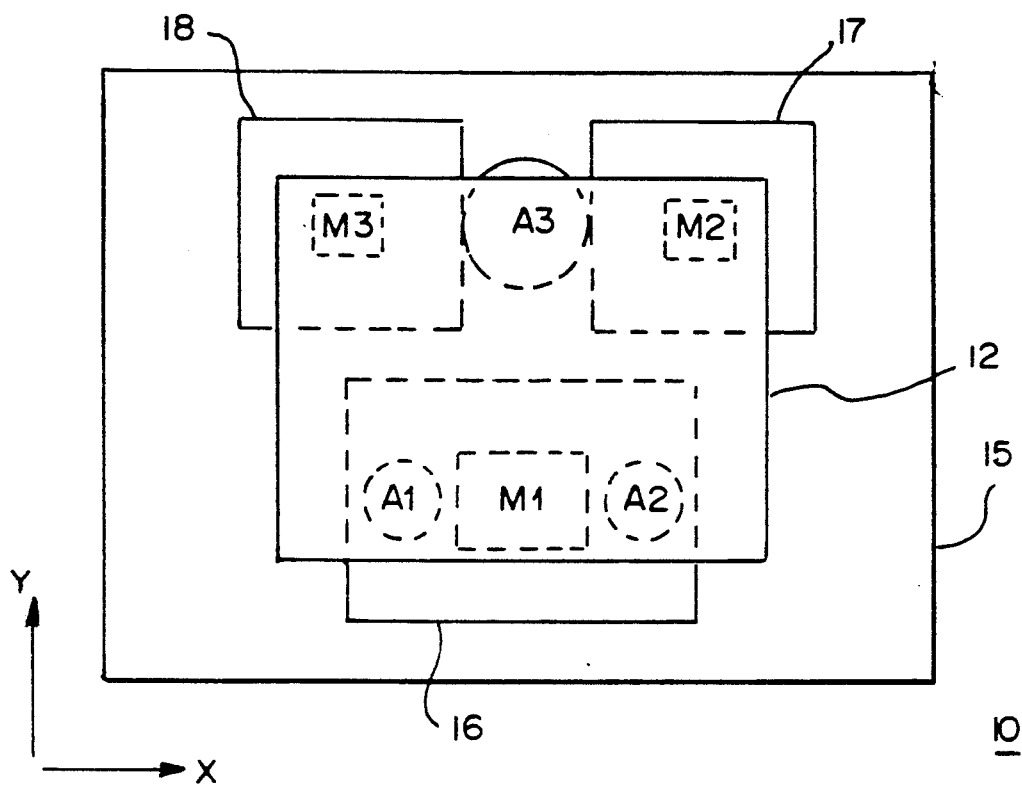
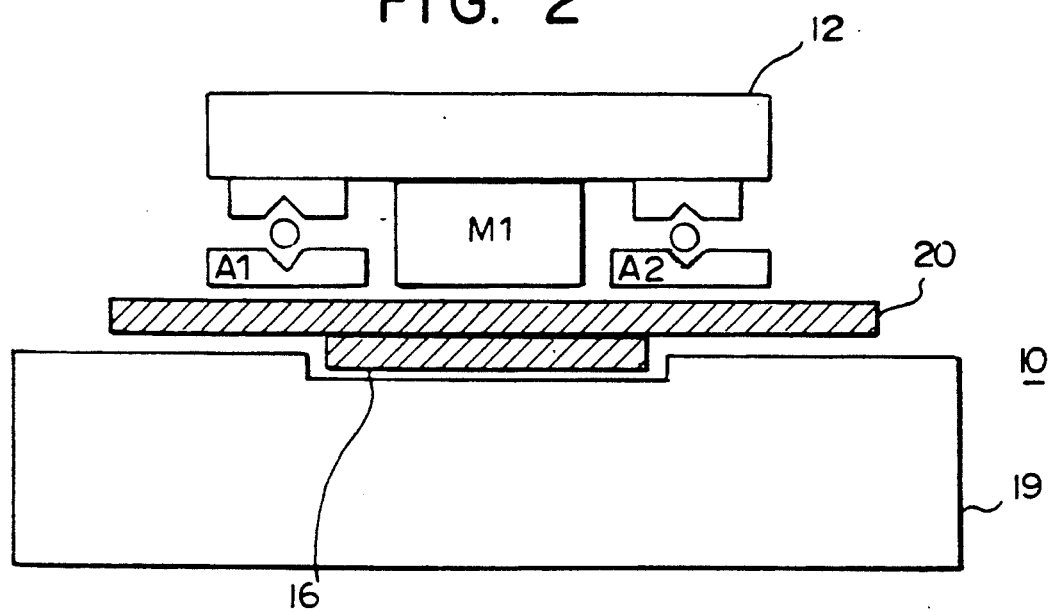

POSITIONING DEVICE FOR PLANAR POSITIONING

BACKGROUND OF THE INVENTION

The present invention relates to positioning devices and, more particularly, to a positioning device having a floating shuttle propelled by independently controlled linear motors, capable of linear motion along two axes and rotary motion, and employing a closed loop control system.

Conventional positioning systems employ electric motors which drive lead screws oriented about orthogonal axes. A table is supported upon a set of rails, or their equivalent, and incorporates a recirculating ball nut which engages the lead screw and thereby propels the table upon rotation of the lead screw. Motion is thus provided along a single linear axis. To facilitate motion along two orthogonal axes, the aforementioned apparatus may be mounted normal to and upon a second set of rails further incorporating a lead screw to drive a recirculating ball nut propelling the first set of rails. The mass of the entire first apparatus must therefore be propelled by the second apparatus, limiting the speed of operation. The use of lead screws and ball nuts requires expensive components and time consuming alignment. Additionally, the mass of the components results in substantial inertia being developed and thus restricts the rapid acceleration and de-acceleration of the table. Furthermore, wear upon the lead screw, the recirculating balls, and the rails results in decreased accuracy, downtime, and maintenance costs.

Other conventional positioning systems employ linear motors which drive a table along orthogonal X-Y coordinate axes, thereby eliminating the use of a lead screw with recirculating balls. In such systems the table once again rides upon a first set of rails in the X-direction, for example, and a second set of rails in the Y-direction. While the first set of rails supports the table and a first linear motor, the second set of rails supports the first set of rafts, the table, the first linear motor, and a second linear motor. The rails slidably support their respective loads upon roller or ball bearings.

In these prior art systems, the second linear motor must drive the weight of the first set of rails and the entire first linear motor along with the table. Once again, rates of acceleration are compromised. The mass necessitates the use of high power linear motors to acceptably accelerate the table to required speeds. Furthermore, the mass limits the rate at which changes in direction may be implemented.

The conventional linear motors employed in positioning devices of the prior art comprise coil assemblies mounted upon a first member, magnet assemblies mounted upon a second member, and the first and second members engaging each other so as to allow linear movement in a single axis. Generally, one member takes the form of a pair of rafts or a channel while the other member slides upon the rails or in the channel by means of ball or roller bearings. In such systems the motion generated is restricted to a single axis. While the table may move linearly in the single axis its orientation remains constant; the table cannot rotate. Furthermore, the rails or the channels must be precisely machined and are subject to wear, thus increasing production and maintenance costs. Finally, if motion is required in a plane rather than in a single axis, an entire second linear motor assembly is employed to move the first linear motor assembly in a direction normal to its axis of motion. This further exacerbates the costs involved.

In the prior art, such as that disclosed in U.S. Pat. No. 3,376,578, positioning devices employ shuttles which float over a surface and are driven by linear stepper motors. Such devices do not provide for rotational motion of the shuttle. Also, the motion such devices are capable of is limited to movement in discrete increments defined the stepper motor controller, the configuration of the stepper motor poles, and the surface configuration of a platen upon which the shuttle rests. Thus, continuously variable positioning cannot be achieved. Another difficulty encountered in such devices is the discontinuous torque applied by the stepping action, which translates into pulsing acceleration and movement; Smooth uniform motion cannot be achieved. Additionally, although pairs of linear stepper motors are employed in such devices, further compensation for offset center of gravities upon the shuttles is not provided nor are means for detecting the torque effects of such offset centers of gravities. Furthermore, such devices are prone to mispositioning of the shuttle due to lost step counts and the inability to independently locate the position of the shuttle.

OBJECTS AND SUMMARY OF THE INVENTION

Accordingly, it is an object of the invention to provide a positioning device which overcomes the drawbacks of the prior art.

It is a further object of the invention to provide a positioning device employing a floating shuttle slidably and rotatably supported by air bearings above a base assembly, capable of motion in a plane, eliminating the need for dual rail or channel structures employed in the prior art.

It is a still further object of the invention to provide a positioning device employing linear motors to linearly and rotatably drive a floating shuttle in a plane without the use of mechanical engagements.

It is yet another object of the invention to provide a positioning device using a floating shuttle wherein offset centers of gravity applied upon the shuttle are compensated for during motion by the use of three linear motors, one operating along a first axis, and two operating along a second axis normal to the first axis. The two linear motors may be operated at dissimilar force levels and directions in order to compensate for the effect of the offset center of gravity.

An object of the present invention is to provide a positioning device having a floating shuttle, driven by linear motors, having optical encoders and gratings for determining the position of the shuttle.

Another object of the present invention is to provide a positioning device having a floating shuttle, driven by linear motors, having laser interferometers and mirror for determining the position of the shuttle.

Additionally, an object of the present invention is to provide a positioning device having reduced travel restrictions employing a checkerboard pattern magnetic array above which a shuttle having linear motor coil assemblies may move in a plane. The checkerboard pattern magnet array provides alternating magnetic field orientations along orthogonal axes with which the coil assemblies functionally interact.

Yet another object of the present invention is to provide a positioning device having a floating shuttle and employing optical encoders and bi-directional optical gratings as position sensing devices. The bi-directional optical gratings reduce travel restriction in conjunction with the checkerboard pattern magnet array above which the shuttle is supported.

Furthermore, the present invention provides a positioning device employing a floating shuttle having three position sensing devices, one of which operates in a first axis, and two of which operate in parallel second and third axis normal to the first axis. The two position sensors detect rotating movements due to offset centers of gravity and send signals to the controller so that linear motors on the shuttle may control the offset.

Still another object of the present invention is to provide a positioning device employing a floating shuttle incorporating linear motor coils assemblies and having internal fin structures for use with either forced-air, fluid, or convection cooling of the coil assemblies.

Still further, the present invention provides a positioning device employing a floating shuttle with linear servo motors wherein the device is capable of continuously variable orthogonal and rotational motion in a plane and continuously sensing a position of the shuttle.

Finally, it is an object of the present invention to provide an omnidirectional linear motor having a shuttle slidably and rotatably supported by air bearings in a plane, employing coil assemblies and a magnet array of a checkerboard configuration in order to provide smooth continuous motion in the plane.

Briefly stated, the present invention provides a positioning device having a shuttle slidably and rotatably supported above a base assembly. A first linear motor urges the shuttle linearly in a first direction while the second and third linear motors urge the shuttle in a second direction, normal to the first direction. The second and third linear motors are separated along an axis in the first direction. The linear motors have magnetic arrays including rows of magnets or a checkerboard array of magnets. Rotary movement of the shuttle is achieved by operating the second and third linear motors in opposing directions or at differing rates. The positions of three points on the shuttle are determined by three optical encoders, or three interferometers, whose signals provide feedback to a controller which actuates the linear motors accordingly.

In accordance with these and other objects of the invention, there is provided a positioning device driven by a controller comprising: a shuttle, a base assembly, means for slidably supporting the shuttle above a surface of the base assembly, linear motors for linearly moving, along orthogonal axes, and rotating the shuttle above the surface of the base assembly, and means for determining a position of the shuttle.

The present invention also provides a positioning device comprising: a shuttle, a base assembly, means for slidably supporting the shuttle in a plane above a surface of the base assembly such that the shuttle may slide in all directions in a plane and may rotate, linear motors for linearly moving and rotating the shuttle above the surface of the base assembly along orthogonal first and second axes, the first axis defining a first direction, the second axis defining a second direction, means for determining a position of the shuttle in the first and second directions, and a controller for driving the linear motor utilizing the means for determining a positions as a source of feedback.

According to a feature of the invention, there is further provided a positioning device driven by a controller comprising: a shuttle, a base assembly, means for slidably supporting the shuttle above a surface of the base assembly including one of air bearings and magnetic beatings, means for linearly moving and rotating the shuttle above the surface of the base assembly without physical contact therebetween comprising: at least three linear motors having coil assemblies, the at least three linear motors including means for producing magnetic fields normal to the surface of the base assembly and with alternating polarity along a first and a second direction, and, the first and second directions being normal to each other in a plane of the surface of the base assembly; the means for producing magnetic fields comprising: a first magnetic array having magnets in a row with pole orientations alternating along an axis in the first direction, second and third magnetic arrays having magnets in a row with pole orientations alternating along an axis in the second direction, and the first, second, and third magnetic arrays being positioned so as to function with the first, second, and third coil assemblies; the coil assemblies and the means for producing magnetic fields being mounted such that the shuttle is moved relative to the base assembly, a first linear motor, of the at least three linear motors, moving the shuttle in the first direction, and a second and a third, of the at least three linear motors, being separated along an axis in the first direction, and each independently moving the shuttle in the second direction such that one of linear and rotary motion is produced, and means for determining a position of the shuttle.

The present invention further includes a positioning device driven by a controller comprising: a shuttle, a base assembly, means for slidably supporting the shuttle above a surface of the base assembly including one of air bearings and magnetic bearings, means for linearly moving and rotating the shuttle above the surface of the base assembly without physical contact therebetween comprising: at least three linear motors having coil assemblies, the at least three linear motors including means for producing magnetic fields normal to the surface of the base assembly and with alternating polarity along a first and a second direction, and the first and second directions being normal to each other in a plane of the surface of the base assembly; the means for producing magnetic fields comprising: a checkerboard magnet array having magnets distributed in a checkerboard pattern having rows and columns, the magnets alternating with nonmagnetic spaces along both the rows and the columns of the checker board pattern, the rows and the columns having the magnets in uniform pole orientations within each of the rows and columns, the rows and columns having alternating orientations of the uniform pole orientations thereof, and the rows and columns being oriented in the first and the second directions, respectively; the coil assemblies and the means for producing magnetic fields being mounted such that the shuttle is moved relative to the base assembly, a first linear motor, of the at least three linear motors, moving the shuttle in the first direction, a second and a third, of the at least three linear motors, being separated along an axis in the first direction, and each independently moving the shuttle in the second direction such that one of linear and rotary motion is produced, and means for determining a position of the shuttle.

According to a still further feature of the invention, there is further provided an omni-directional linear motor comprising: a shuttle, a base assembly, means for slidably supporting the shuttle above a surface of the base assembly, means for linearly moving and rotating the shuttle above the surface of the base assembly without physical contact therebetween comprising: coil assemblies, means for producing magnetic fields normal to the surface of the base assembly with alternating polarity along a first and a second direction, and the first and second directions being normal to each other in a plane of the surface of the base assembly; the means for producing magnetic fields comprising: a checkerboard magnet array having magnets distributed in a checkerboard pattern having rows and columns, the magnets alternating with non-magnetic spaces along both the rows and the columns of the checker board pattern, the rows and the columns having the magnets in uniform pole orientations within each of the rows and columns, the rows and columns alternating orientations of the uniform pole orientations thereof, and the rows and columns being oriented in the first and the second directions, respectively; the coil assemblies and the means for producing magnetic fields being mounted such that the shuttle is moved relative to the base assembly, a first coil assembly of the coil assemblies moving the shuttle in the first direction, a second and a third coil assembly, of the coil assemblies, being separated along an axis in the first direction, and each independently moving the shuttle in the second direction such that one of linear and rotary motion is produced, and, means for driving the coil assemblies.

The present invention also includes the above embodiments wherein, in the alternative, the means for producing magnetic fields comprises: a first coil array having coils in a row along an axis in the first direction, second and third coil arrays having coils in a row along an axis in the second direction, and the first, second, and third magnetic arrays being positioned so as to function with the first, second, and third coil assemblies such that magnetic fields are produced by the first second and third coil arrays by means of induction due to the generation of magnetic fields by the first, second, and third coil assemblies, respectively, such that the coil arrays move relative to the coil assemblies.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a simplified front view of a small travel range positioner in accordance with the present invention.

FIG. 2 is a simplified top view of the small travel range positioner of FIG. 1.

DETAILED DESCRIPTION OF THE PREFERRED EMBODIMENT

Figure 3:
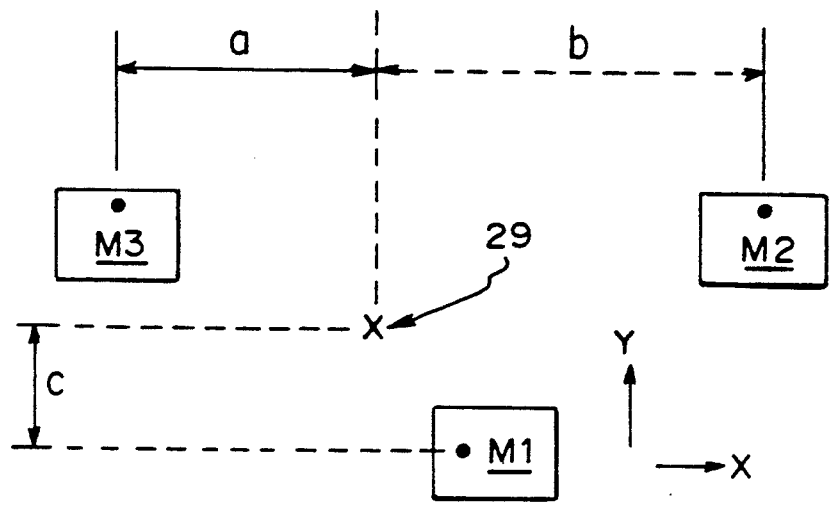
FIG. 3 is a diagram showing the relationship of a center of gravity to the positions of linear motors in the present invention.

Referring to FIG. 1, there is shown a simplified top view of a small travel range positioner 10 in accordance with the present invention. Positioner has a shuttle 12 upon which are mounted linear motors M1, M2, and M3, wherein the term "linear motor" refers specifically to the coil assemblies thereof. The shuttle 12 is supported above a base assembly 15 by air bearings A1, A2, and A3.

The air bearings A1, A2, and A3, support the shuttle 12 over the base assembly 15 eliminating the need for mechanical beatings, used in the prior art, which would require physical contact with the base assembly 15. Mechanical bearings experience wear which results in loss of positioning accuracy due to inconsistent travel. Additionally, the need to replace worn bearings, in order to maintain accuracy, results in labor and downtime expenses. Thus, the use of a shuttle 12 supported by air bearings A1, A2, and A3, results in a more reliable positioner which is less expensive to maintain. In the alternative, magnetic bearings may also be used to support the shuttle 12 above the surface of the base assembly 15. Furthermore, either magnetic bearings or air bearings A1, A2, and A3, may incorporate a pivotal means of attachment to the shuttle thereby allowing the bearings to pivot and adapt to surface irregularities.

Motor magnet arrays 16, 17, and 18, are imbedded in the base assembly 15 and interact with linear motors M1, M2, and M3, respectively, to move the shuttle 12 in both the X and the Y directions, as depicted in FIG. 1, and in a rotational direction about a Z-axis. The range of motion of the shuttle 12 is limited to ranges wherein the linear motors M1, M2, and M3 remain above their respective motor magnet arrays 16, 17 and 18, respectively.

Referring to FIG. 2, motor magnet array 16 is shown mounted in a recess in a base 19. A surface sheet 20 covers motor magnet array 16 and motor magnet arrays 17, and 18 (not shown). The surface sheet 20 may be composed of a hard non-magnetic material such as glass or a ceramic. The surface sheet 20 provides a hard flat surface above which the air bearings A1, A2, and A3, float upon a cushion of air. The distance between the surface and the air bearings may be on the order of 0.0002 inches.

Alternatively, a ceramic coating may be applied to the base instead of a sheet of ceramic. Yet another alternative includes machining and/or grinding the surface of the base 19 along with motor magnet arrays 16, 17, and 18, to provide an adequately smooth surface over which the air bearings A1, A2, and A3 may float.

Alternative embodiments of the present invention include a configuration wherein linear motors are mounted in a base and magnet arrays are mounted in a shuttle. This arrangement calls for distributing motor coils of the linear motors over areas of a base over which a shuttle is intended to travel.

FIG. 3 depicts the relationship of a center of gravity 29 to the positions of linear motors M1, M2, and M3. Linear motor M1 produces movement in the X-direction while linear motors M2 and M3 produce movement in the Y-direction. Distances a, b, and c represent the distances from the center of gravity to the centers of the various linear motors M1, M2, and M3 along the x-y axes. The linear motors M1, M2, and M3, may be of varying construction, however, in the present embodiment three phase linear servo motors are employed having either magnetic or nonmagnetic armatures. Electromagnetic couplings of the polyphase motors provide for smooth and continuous motion and torque.

When the center of gravity 29 is in line with linear motor M1 in the X-direction, movement in the X-direction may be produced by linear motor M1 alone.

When the center of gravity is offset from the X-axis of linear motor M1, and linear motor M1 is actuated alone, a torque is produced upon the shuttle 12 which causes rotation to occur when traveling in the X-direction. In order to prevent this rotation, linear motors M2 and M3 are actuated in opposing directions, along with linear motor M1, to provide a counter-balancing torque upon the shuttle, counteracting the torque produced by the offset center of gravity 29 and permitting linear movement in the X-direction. In such a situation, where a force F1 is applied by linear motor M1, linear motors M2 and M3 must apply forces in opposing directions equal to a force determined by the formula:

$$F = (F1 \times c)/(a+b).$$

When the center of gravity is on a Y-axis centered between linear motors M2 and M3, linear motors M2 and M3 apply equal force in order to produce linear motion in the Y-direction. However, as above, if the center of gravity is offset from the centered Y axis then a torque is produced upon the shuttle when equal force is applied by both linear motors M2 and M3. When a force F2 is to be applied in the Y-direction to the center of gravity 29, linear motor M2 must produce a force $F_{M2}$ determined by the formula:

$$F_{M2} = (F2 \times a)/(a+b);$$

linear motor M3 must produce a force $F_{M3}$ determined by the formula $$F_{M3} = (F2 \times b)/(a+b).$$

In this embodiment of the invention linear motor M1 is capable of producing twice the force of linear motors M2 and M3. Similarly, referring back to FIG. 1, the lifting force of air bearing A3 is twice that of air beatings A2 and A3.

While linear motors M2 and M3 may be used to counteract torque and prevent rotation of the shuttle when the center of gravity is offset, they may also be employed to produce torque in order to rotate the shuttle. The controller actuates linear motors M2 and M3 so as to produce unequal displacements along Y-axis of linear motors M2 and M3. The displacements are determined by means for sensing discussed below.

Figure 4:
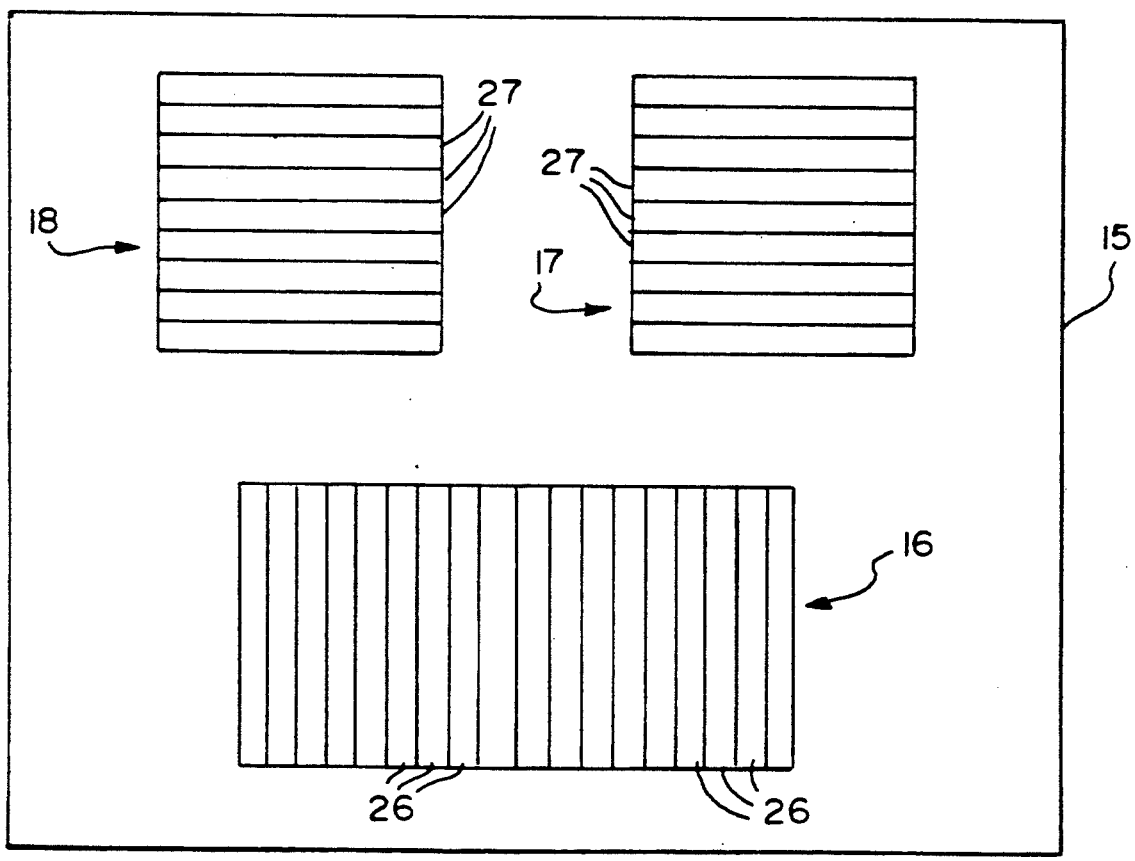
FIG. 4 is a top view of the base assembly 15 with motor magnet arrays of the small travel range positioner.

Referring to FIG. 4, a top view of a base assembly, with motor magnet arrays, 16, 17, and 18 is shown. Motor magnet array 16 is composed of magnets 26 while motor magnet arrays 17 and 18 are composed of magnets 27. The magnets, 26 and 27, have pole orientations that are normal to the plane of the figure and which alternate with each successive magnet 26, 27 in arrays 16, 17, and 18.

Figure 5:
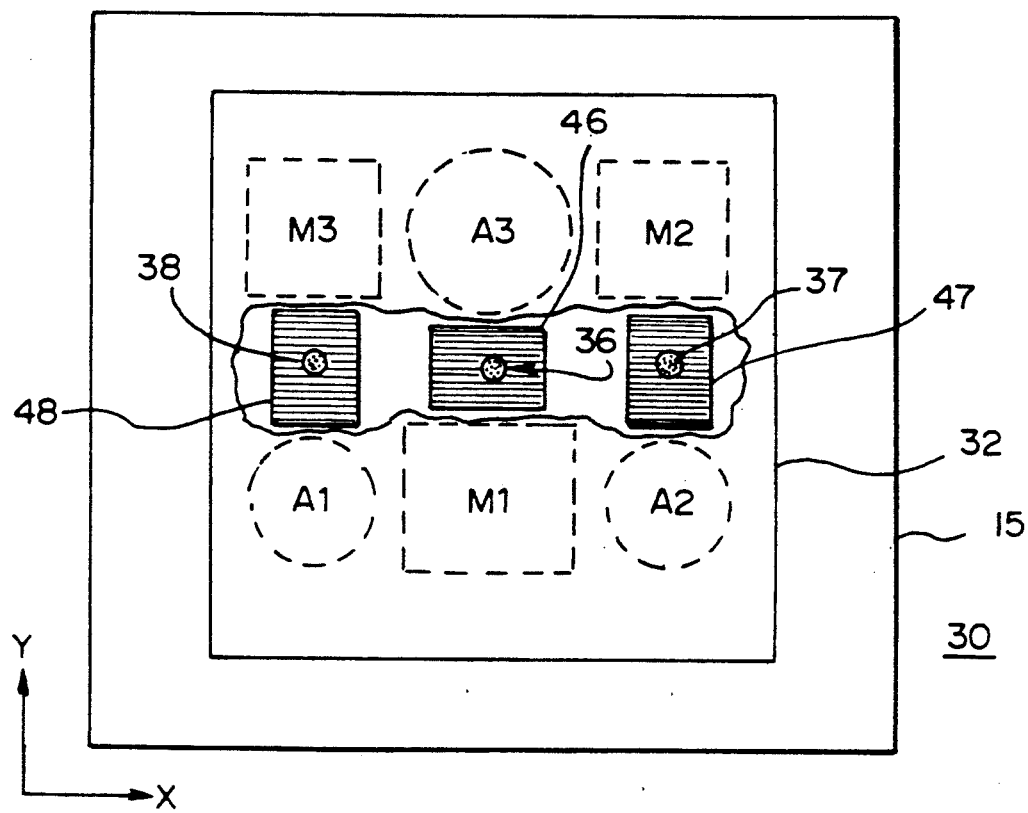
FIG. 5 is a simplified top view of a small travel range positioner with a shuttle having an X-direction optical encoder and two Y-direction optical encoders.

Referring to FIG. 5, a simplified top view of a small travel range positioner 30 with a shuttle 32 having an X-direction optical encoder 36 and two Y-direction optical encoders 37 and 38 as means for displacement sensing. An X-direction encoder grating 46 is attached to base assembly 15 beneath the X-direction optical encoder 36. Similarly, Y-direction optical encoder gratings 47 and 48 are attached to base assembly 15 beneath Y-direction optical encoders 37 and 38 respectively. The optical encoders 36, 37, and 38, are use to detect distances of travel in their respective directions. Signals from the optical encoders 36, 37, and 38, provide feedback to a controller which controls the linear motors M1, M2, and M3.

Optical encoders 36, 37, and 38 may be of any convenient type. For purposes of description, optical encoders 36, 37 and 38 include light sources such as for example, lasers, projected upon their respective encoder gratings 46, 47, and 48. The light is detected after projection through a polarized filter. The gratings have lines engraved thereon which are coincident in direction with the polarized filters and which are normal to the direction of travel to be sensed. The light sensed therefore varies periodically and continuously with the travel in the respective direction of the optical encoder. Thus, due to the continuous variations in the light level sensed, and the known spacings of the grating, the position of the shuttle may be determined continuously.

The pair of Y-direction optical encoders, 37 and 38, permit detection of torque-induced shuttle 32 rotation indicated by unequal displacements sensed along the respective axes of Y-direction optical encoders 37 and 38. The controller determines how far the shuttle 32 has moved, in each direction, from an initialization point, and whether torque upon the shuttle 32 has caused it to rotate.

From the above specification, it would be apparent to one skilled in the art that, in the alternative, two optical encoders may be used to sense displacement in the X-direction and one may be used to sense displacement in the Y-direction. The two sensors operating in the X-direction would permit the detection of unequal displacements, and thus, detection of rotation of the shuttle. Therefore, it is apparent that the number of sensors operating in a given direction need not equal the number of linear motors operable in the given direction.

The controller drives the linear motors M1, M2, and M3 with continuous polyphase signals whose levels and phase relationships are determined by a function utilizing the feedback signals from the encoders 36, 37, and 38. The linear motors M2 and M3 generate force counteracting torque due to offset centers of gravity and driving the motors until an intended destination is reached. The controller also rotates the shuttle 32 by driving linear motors M2 and M3 in opposing directions and detecting the resultant rotation via Y-direction encoders, 37 and 38. The shuttle 32 may be rotated through a range in which the linear motors M1, M2, and M3 are operational. Thus, the system of the present invention is capable of both continuous rotational motion through an angle and orthogonal linear motion.

Figure 6:
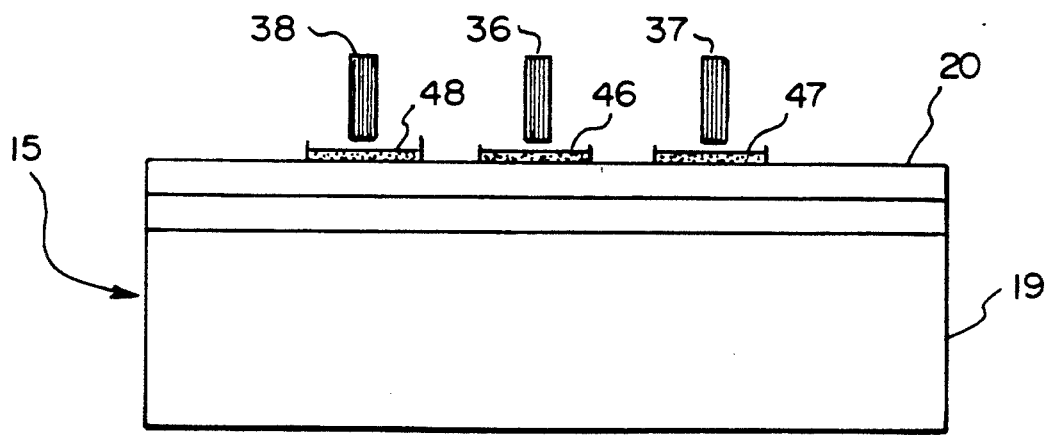
FIG. 6 is a front view of a base assembly of the small travel range positioner of FIG. 5 showing the optical encoders positioned above optical encoder gratings.

Referring to FIG. 6, a front view of the base assembly 15 is shown with optical encoders 36, 37, and 38, positioned above optical encoder gratings 46, 47, and 48, respectively. The shuttle (32 in FIG. 5) is not shown in FIG. 6, however, in the embodiment depicted the optical encoders 36, 37, and 38, are mounted upon the shuttle. The gratings 46, 47, and 48, are mounted upon the surface sheet 20 and are scanned through apertures in the shuttle 32. Alternatively, gratings may be mounted on the bottom of the shuttle 32 and optical encoders 36, 37, and 38, mounted in the base 19. Yet another embodiment has a fixed bridge, above the shuttle and the base, whereupon the optical encoders 36, 37, and 38, or the gratings are mounted and the shuttle has the gratings or optical encoders 36, 37, and 38, respectively, mounted upon it.

Figure 7A:
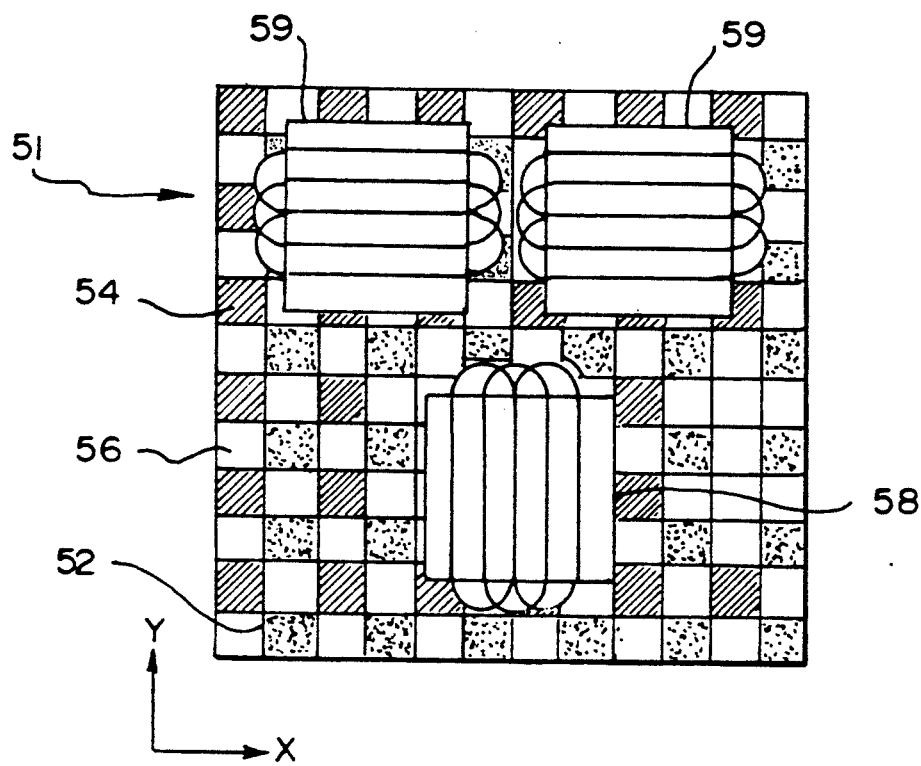
FIG. 7a is a top view of a base assembly of a large travel range positioner having a checker board magnet array with motor coils superposed thereupon.
Figure 7B:
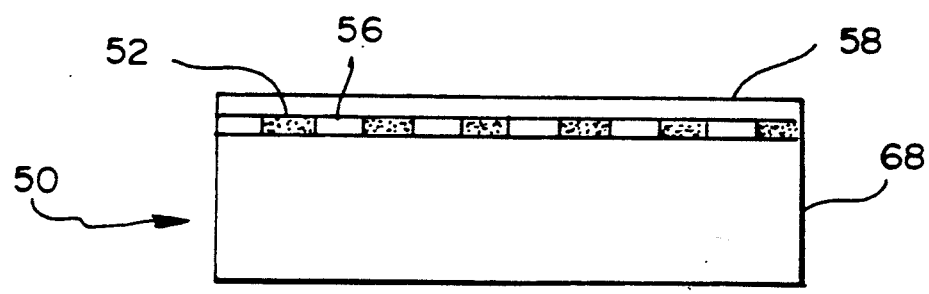
FIG. 7b is a front view of the base assembly of FIG. 7b.

Referring to FIGS. 7a and 7b, a surface of a base assembly 50 of a large travel range positioner is shown with X-direction and Y-direction three phase motor coils 58 and 59 superposed above it (the motor coils are shown oversized in order to clearly illustrate coil orientation). The motor coils 58 and 59 represent coils of linear motors M1, M2, and M3 (depicted without their enclosing shuttle assembly). The large travel range positioner is identical to the above embodiments of the present invention except as described herein. The base assembly 50 has a magnet array 51 having a checkerboard distribution of north pole oriented magnets 52, south pole oriented magnets 54, and non-magnetic areas 56. In such an embodiment, movement of the shuttle is not restricted to limited areas as in the small travel range positioner 10 shown in FIG. 1. A range of motion is generally determined by a distance by which a magnetic array exceeds a size of a linear motor in a given direction. Thus, the embodiment of FIG. 7a permits motion over the entire base assembly while in the small travel range positioner 10 the linear motors M1, M2, and M3, are restricted to movement above magnet arrays 16, 17, and 18.

In the checker board arrangement the magnets, 52 and 54, have alternating pole orientations such that a plane, moving in either the X-direction or the Y-direction, passes successively over magnets, 52 and 54, having opposite pole orientations thus facilitating movement in either direction. Since the magnets, 52 and 54, occupy half the area under the motor coils, 58 and 59, the linear motors generate half the force of the linear motors M1, M2, and M3, (shown in FIGS. 1-3, 5) of the small travel range embodiment of the present invention.

One skilled in the art would recognize from the above disclosure that, absent the presence of position sensors, the present invention includes an omni-directional linear motor having an improved range of travel. The range is not limited by physical constraints of magnet arrays having single row alternating pole orientations only in a single direction.

Referring to FIG. 7b, an optical grating sheet 58 is applied over the over the entire magnetic array 51. A suitable optical grating has a thickness introducing minimal interference with the linear motors' operation, and a composition of non-magnetic materials. Optical encoders 36, 37, and 38 (see FIG. 6), on the shuttle monitor the shuttle's location based on the traveled distance sensed in both the X and Y directions. The optical grating sheet 58 has overlapping gratings in both the X and Y directions permitting encoders to operate therewith along either coordinate.

Figure 8:
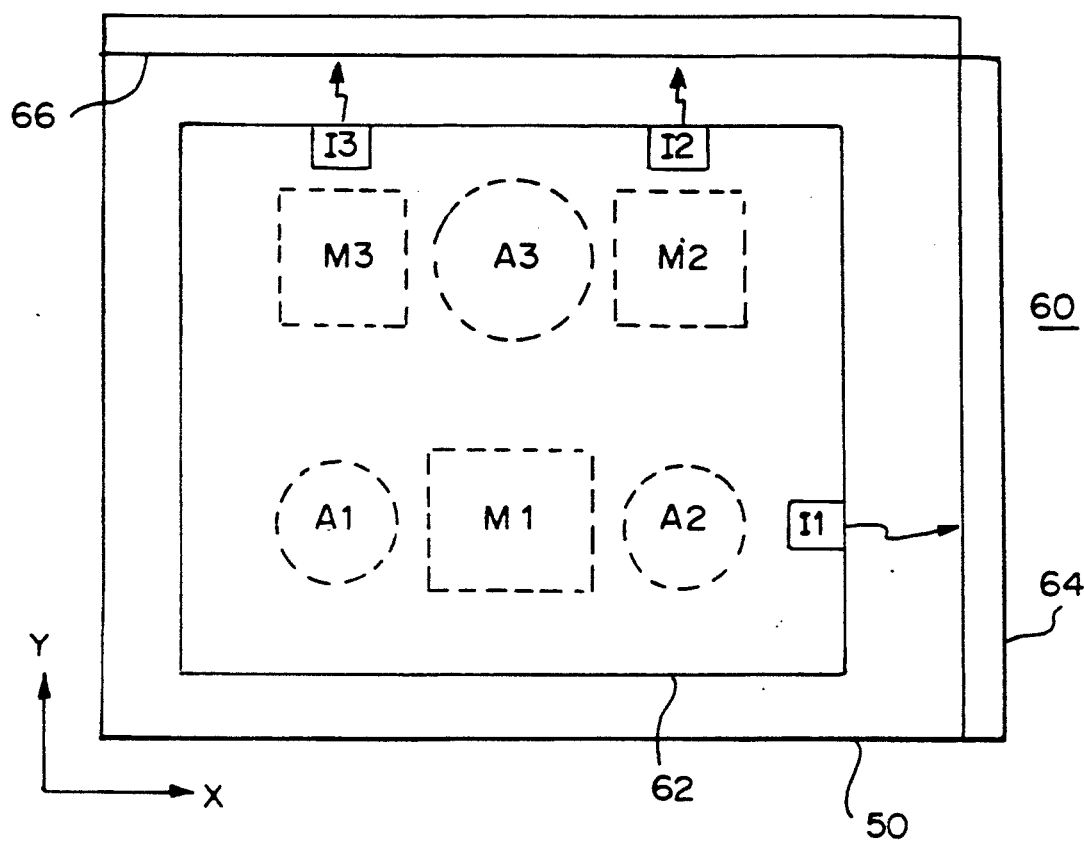
FIG. 8 is a simplified top view of a positioner of the present invention having laser interferometers.

Referring to FIG. 8, a large travel range positioner 60 of the present invention is shown having laser interferometers I1, I2, and I3, mounted upon shuttle 62. The interferometers I1, I2, and I3, are used for sensing distances traveled in the X, and Y directions, respectively. The interferometers I1, I2, and I3, take the place of the optical encoders of the above embodiments. An X-axis mirror 64 extends along a side of base assembly 50 in the Y-direction and a Y-axis mirror 66 extends along a side of base assembly 50 in the X-direction. As is well known, interferometers produces amplitude-varying signals, related to the round-trip distance a light beam travels between the interferometers, their respective mirrors, and return to the interferometers. These amplitude-varying signals are used in the same way as the amplitude-varying optical signals passing through the gratings in the previous embodiment.

Figure 9:
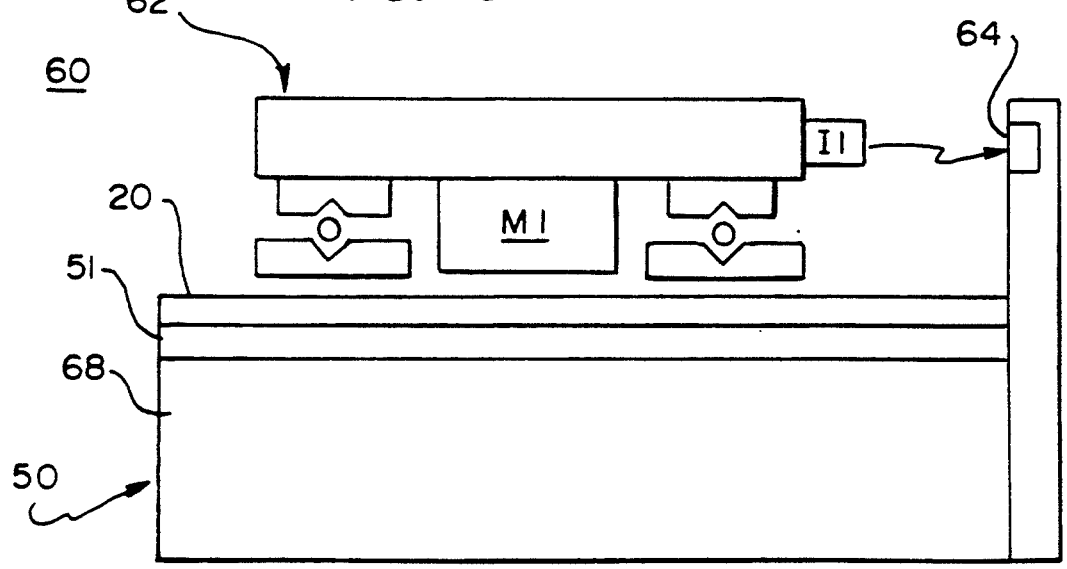
FIG. 9 is a side view of the positioner of FIG. 8.

Referring to FIG. 9, a side view of the positioner 60 is shown. The X-axis mirror 64 is mounted horizontally in line with interferometer I1 above the base assembly 50. The base assembly 50 has the checker board configuration magnet array 51 interposed between a base 68 and optional surface sheet 20 replacing the optical grating sheet shown in FIG. 7a.

Referring to FIGS. 8 and 9, the shuttle 62 is supported by air beatings A1, A2, and A3, above the flat surface of the surface sheet 20. Y-axis interferometers I2 and I3 detect the displacement of the shuttle in the Y-direction and rotation of the shuttle due to torque. Signals from the laser interferometers I1, I2, and I3, are fed to a conventional controller (not shown) which uses the signals as feedback for actuating the linear motors I1, I2, and I3. Thus, torque is controlled in order to prevent rotation or to produce rotation of the shuttle 62.

The signals from either interferometers I1, I2, and I3, or optical encoders 36, 37 and 38 are processed in the controller. The controller processes the signals using an algorithm to perform a transformation of coordinates. The algorithm compensates for distances between each sensor and each sensor's relative position to a common point of interest of the shuttle. The algorithm then determines the output levels and phasing for each linear motor M1, M2, and M3 based upon computations utilizing the above described equations. Furthermore, proportioning is determined for the signals applied to linear motors M2 and M3 so as to either rotate the shuttle or compensate for an undesired torque caused by and offset center of gravity.

In operation, the controller must first interpret signals from the sensors, translating the signals into values of distance travelled. Based upon these values and a known starting reference point, the position and orientation of the shuttle may be determined. Since each sensor may be located in a different position on the shuttle, the controller must compensate for these separating distances in determining position and utilize the separating distances in computing orientation. Successive shuttle positions may then be used to determine rates of motion and acceleration. The controller then drives the various linear motors accordingly so as to maintain the shuttle at predetermined positions, orientations, and rates of motion and acceleration. The accuracy of the sensors and the controller, and the sensitivity of the linear motors, thus determine the positioning accuracy of the shuttle. These parameters determine the closed loop error of the system.

Figure 10:
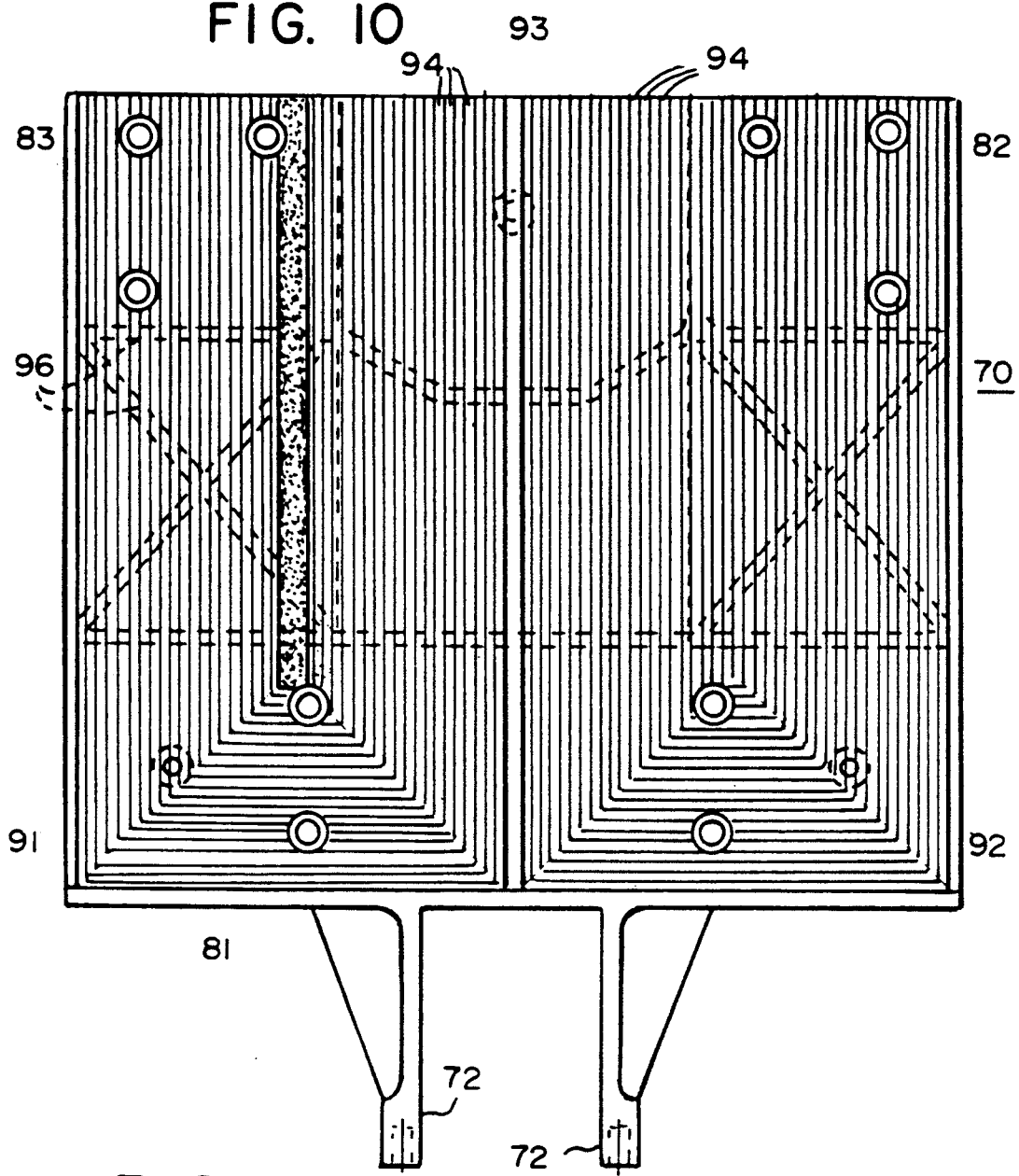
FIG. 10 is a detailed top view of an embodiment of a shuttle frame showing rib and fin structures.

Referring to FIG. 10, a detailed top view of an embodiment of a shuttle frame 70 is shown. Mounting arms 72 protrude from the front of the shuttle frame 70 and serve to support a device or workpiece to be positioned. Sets of mounting holes 81, 82, and 83, are provided for mounting linear motors M1, M2, and M3 (not shown), respectively. Mounting holes 91, 92, and 93, are provided for mounting air bearing A1, A2, and A3, respectively. The bulk of a top surface of the shuttle frame 70 is comprised of fins 94. Beneath the fins 94 lie stiffening ribs 96.

Figure 11:
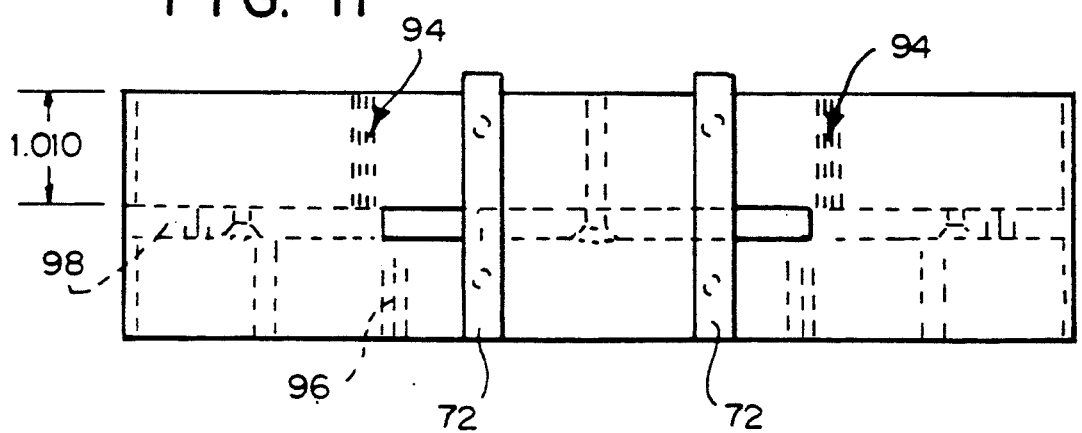
FIG. 11 is a detailed side view of the shuttle frame of FIG. 10 showing a middle plate between the rib and fin structure.

Referring to FIG. 11, a side view of the shuttle frame 70 shows a middle plate 98 extending throughout the shuttle frame 70 between the ribs 96 and the fins 94. The linear motors M1, M2, and M3, are mounted against the middle plate 98 to dissipate heat through the middle plate 98 and fins 94 where it is absorbed in forced air circulating through channels between the fins 94. The forced air is contained in the channels by a cover (not shown) fastened atop the shuttle frame 70. In order to permit rapid movement of the shuttle frame 70 with a minimum of power required from the linear motors M1, M2, and M3, the shuttle is composed of an aluminum alloy or other low mass thermally conductive material.

In light of this specification, one skilled in the art would appreciate that various fin and rib arrangements may be used. Furthermore, while forced air is used in the embodiment depicted, other methods of cooling, including liquid and convection methods as examples and not limits, may be used without departing from the scope and spirit of the present invention. Additionally, while protruding arms 72 are used to position an article in front of the shuttle frame 70 in the present embodiment, the invention is not limited to such an embodiment and an article to be positioned may be attached to the shuttle frame 70 by other means without departing from the scope of the present invention.

Figure 12:
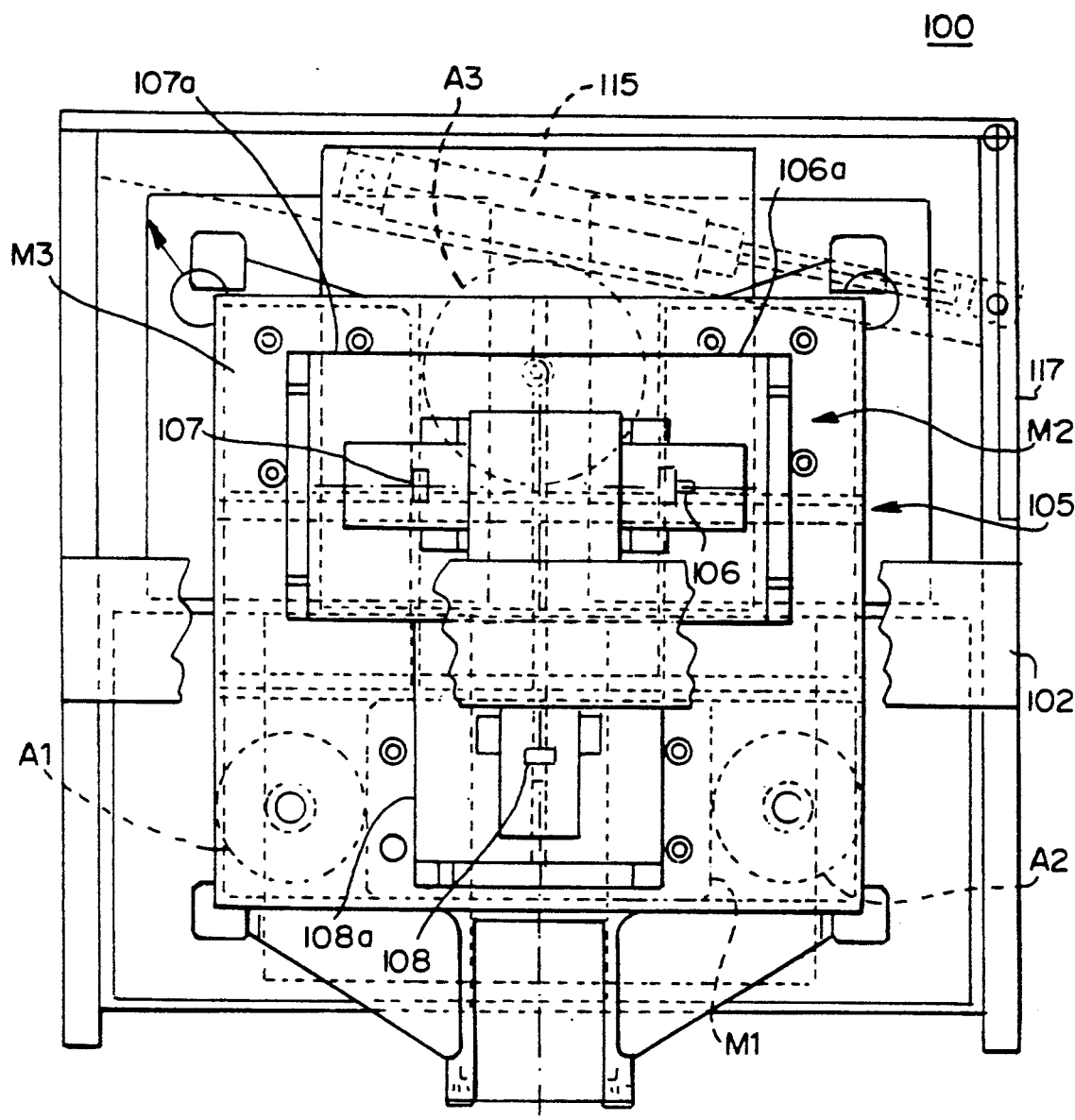
FIG. 12 is a detailed top view of a positioner having the shuttle frame of FIGS. 10 and 11.

Referring to FIG. 12, a detailed top view of a positioner 100 of the present invention is shown. The positioner 100 has a bridge 102 superposed over a shuttle assembly 105. The bridge 102 has Y-direction optical encoders, 106, 107, and an X-direction optical encoder 108 mounted upon it. The encoders 106, 107, and 108, are mounted over optical grating plates 106a, 107a, and 108a, respectively, which are mounted upon a cover plate 109 of the shuttle assembly 105. Air bearings A1, A2, and A3, are shown located on the underside of the shuttle assembly 105 along with linear motors M1, M2, and M3.

Figure 13:
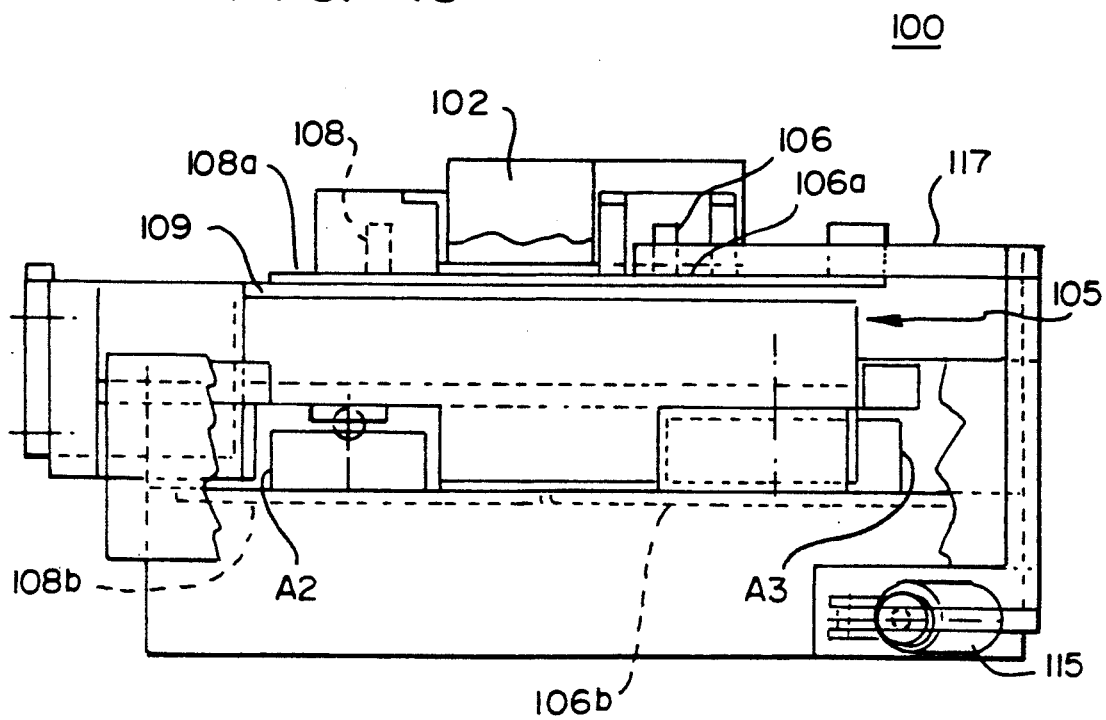
FIG. 13 is a detailed side view of the positioner of FIG. 12.

FIG. 13 presents a detailed side view of positioner 100. Optical encoders 106 and 108 are shown mounted above grating plates 106a and 108a. The grating plates 106a and 108a are affixed to cover plate 109 of shuttle assembly 105. Air bearings A2 and A3 are shown supporting shuttle assembly 105 above the surface sheets 106b and 108b, respectively.

In FIGS. 12 and 13, an intake duct (not shown) attaches to the rear of the shuttle frame 70. Forced air enters the intake duct and passes through the channels of the shuttle frame 70 cooling linear motors M1, M2, and M3. The cover plate 109 restricts the forced air to flow through the channels. Other embodiments of the present invention may utilize a cooling fluid in place of the forced air, or may include apertures in the cover 109 facilitating convection cooling of the shuttle assembly 105 and its coil assemblies of linear motors M1, M2, and M3.

Actuator 115 rotates positioning arm 117, via a lever and shaft such that the positioning arm 117 moves the shuttle assembly 105 to a home position as it sweeps through its rotating range. When the shuttle assembly 105 is in the home position the controller then has a known fixed point from which to determine subsequent positions of the shuttle assembly by means of displacement detecting encoders 106, 107, and 108. In the embodiment presented the actuator 115 is pneumatic, however, one skilled in the art would appreciate the use of hydraulic, or electric means by which the shuttle assembly 105 may be moved to a home position. Such means include, but are not limited to, an electric motor or solenoid rotating an arm, electromagnets pulling the shuttle assembly 105, or linear motors propelling the shuttle assembly 105.

Figure 14:
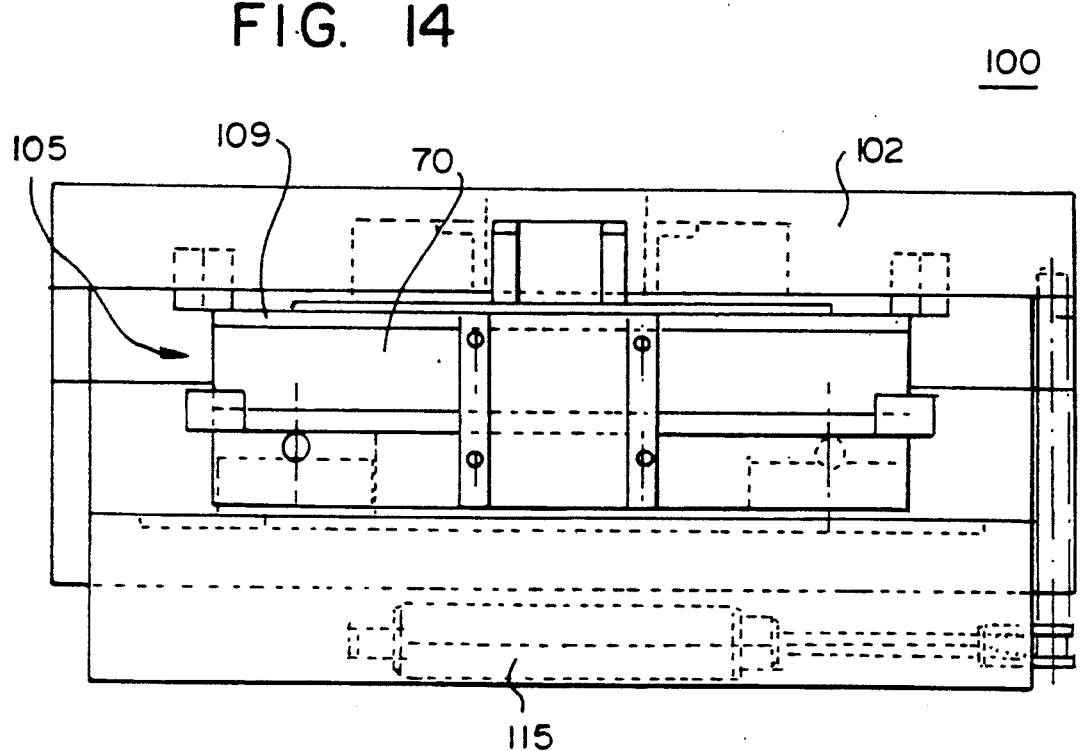
FIG. 14 is a detailed front view of the positioner of FIGS. 12 and 13.

FIG. 14 presents a front view of positioner 100 wherein the bridge 102 is shown crossing over the top of the shuttle assembly 105.

Yet another embodiment of the present invention incorporates linear induction motors wherein a base plate has grooves in a conductive layer. The grooves form the equivalent of coils in the conductive layer, analogous to the rotor of a squirrel cage induction motor. Linear motors M1, M2, and M3 generate magnetic fields which induce the production of magnetic field by the coils form in the conductive layer. The linear motor thus functions using the induction principle of conventional induction motors. The grooves may be used to produce coils in the place of the magnets of the previous embodiments. Likewise, wound coils may be used.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:
1. A positioning device comprising:
 a shuttle;
 a base assembly having a planar surface;
 means for slidably supporting said shuttle in a plane above said planar surface of said base assembly;
 said means for slidably supporting including means for permitting said shuttle to slide in any direction in said plane;
 a plurality of linear motors for linearly moving said shuttle above said surface of said base assembly along orthogonal first and second axes in a continuously variable manner;
 said plurality of linear motors including a plurality of magnets;
 said linear motors passing a current through a magnetic field produced by said plurality of magnets thereby producing a force;
 said first axis defining a first direction; and
 said second axis defining a second direction.
2. A positioning device of claim 1 wherein:
 said means for slidably supporting said shuttle includes at least one of air bearings and magnetic bearings; and
 said means for slidably supporting includes means for permitting rotation of said shuttle.
3. A positioning device comprising:
 a shuttle;

a base assembly;

means for slidably supporting said shuttle in a plane above a surface of said base assembly such that said shuttle is slidable in a plane;

linear motors for linearly moving said shuttle above said surface of said base assembly along orthogonal first and second axes in a continuously variable manner;

said linear motors including magnets generating forces by acting upon a current traveling through a magnetic field of said magnets;

said first axis defining a first direction;

said second axis defining a second direction;

said linear motors including at least first, second and third linear motors;

said first, second and third linear motors including first, second and third coil assemblies, respectively;

said first linear motor including means for producing a first force on said shuttle along said first axis;

said second and third linear motors including means for producing second and third forces at spaced-apart locations on said shuttle along said second axis whereby differential actuation thereof is effective to produce a torque on said shuttle.

4. A positioning device of claim 3 wherein:

said first linear motor includes said magnets comprising a first magnetic array having magnets in a row with pole orientations alternating in a direction of said first axis; and said second and third linear motors includes said magnets comprising second and third magnetic arrays, respectively, each having magnets in a row with pole orientations alternating in a direction of said second axis.

5. A positioning device of claim 4 wherein said first, second, and third magnetic arrays are affixed to said base assembly and said first, second, and third coil assemblies, respectively interacting therewith, are affixed to said shuttle.

6. A positioning device of claim 4 wherein said first, second, and third magnetic arrays are affixed to said shuttle and said first, second, and third coil assemblies, respectively interacting therewith, are affixed to said base assembly.

7. A positioning device of claim 4 wherein said means for slidably supporting includes:

first, second and third air bearings;

each of said first, second and third air bearings being associated with one of said first, second and third linear motors, respectively;

said surface of said base assembly including one of a hard flat sheet of material, a ceramic coating, and a flat surface of a base; and said surface being of suitable flatness for operation of said air bearing thereon.

8. A positioning device of claim 4 comprising:

first, second and third optical gratings parallel to said surface and having lines engraved thereon;

first, second and third optical encoders having means for detecting travel over said first, second and third optical gratings, respectively, in directions normal to said lines;

said first, second and third optical gratings being fixed to one of said shuttle and said base assembly and said first, second and third optical encoders being fixed to the other of said shuttle and said base assembly;

said first optical encoder detecting displacement along said first axis;

said second and a third encoders detecting displacement along said second axis; and said second and third encoders being spaced apart a distance in a direction of said first axis so that rotating motion of said shuttle is detected.

9. A positioning device of claim 4 comprising:

a first, a second, and a third interferometer;

a first and a second mirror;

said first interferometer and said first mirror being mounted such that displacement in said first direction is detected and a first signal sent to said controller;

said second and third interferometers and said second mirror being mounted such that displacement of said shuttle in said second direction is detected, and second and third signals are sent to said controller; and said second and third interferometers being spaced apart from each other in a direction of said first axis so that rotating motion of said shuttle is detected.

10. A positioning device of claim 1 wherein the magnets of said linear motors include:

a checkerboard magnet array having magnets distributed in a checkerboard pattern having rows and columns;

said magnets alternating with non-magnetic spaces along both said rows and said columns of said checker board pattern;

said rows and said columns having said magnets in uniform pole orientations within each thereof;

said rows and columns alternating orientations of said uniform pole orientations thereof; and said rows and columns being oriented in said first and said second directions, respectively.

11. A positioning device of claim 10 comprising:

an optical grating having lines engraved thereon;

first, second and third optical encoders having means for detecting travel with respect to said optical grating in a direction normal to said lines;

said optical gratings being mounted fixed with respect to one of said shuttle and said base assembly and said optical encoders being mounted fixed with respect to another one of said shuttle and said base assembly;

said first optical encoder detecting displacement in said first direction;

said second and third optical encoders detecting displacement in said second direction; and said second and third encoders being spaced a distance apart from one and other in said first direction so that rotating motion of said shuttle is detected.

12. A positioning device of claim 11 wherein said optical grating is mounted upon said shuttle and said first second and third optical encoders are mounted upon a bridge over the shuttle and supported by the base assembly.

13. A positioning device of claim 10 comprising:

a controller;

first, second, and third interferometers;

first and second mirrors;

said first interferometer and said first mirror being mounted such that displacement in said first direction is detected and a signal sent to said controller;

said second and third interferometers and said second mirror being mounted such that displacement of said shuttle in said second direction is detected; and said second and third interferometers being spaced apart in the said first direction so that rotating motion of said shuttle is detected.

14. A positioning device of claim 10 wherein said checkerboard magnet array is affixed to said base assembly and said first, second, and third coil assemblies are affixed to said shuttle.

15. A positioning device of claim 10 wherein said checkerboard magnet array is affixed to said shuttle and said first, second, and third coil assemblies are affixed to said base assembly.

16. A positioning device of claim 10 wherein said means for slidably supporting comprise:

air bearings;

said surface of said base assembly including one of a hard flat sheet of material, a ceramic coating, and a flat surface of a base; and said surface being suitable for operation of said air bearing thereon.

17. A positioning device comprising:

a shuttle;

a base assembly;

means for slidably supporting said shuttle in a plane above a surface of said base assembly such that said shuttle is slidable in any direction in said plane;

linear motors for linearly moving said shuttle above said surface of said base assembly along orthogonal first and second axes in a continuously variable manner;

said linear motors including means for producing magnetic fields;

said linear motor including means for carrying currents in said magnetic fields, thereby producing forces;

said first axis defining a first direction;

said second axis defining a second direction;

means for determining a position of said shuttle in said first and second directions;

said means for carrying current including coil assemblies;

said linear motors including means for producing magnetic fields:

said means for producing magnetic fields including a coil array having coils in a rows along said first axis and said second axis; and said coil array being positioned to interact with said coil assemblies by inducing the production of magnetic fields by said coil array by induction due to the generation of magnetic fields by said coil assemblies, whereby the coil arrays move relative to the coil assemblies.

18. A positioning device of claim 17 wherein said coil array is affixed to one of said base assembly and said shuttle, and said coil assemblies are affixed to another one of said shuttle and said base assembly.

19. A positioning device comprising:

a shuttle;

a base assembly;

means for slidably supporting said shuttle in a plane above a surface of said base assembly such that said shuttle is slidable in all dimensions of said plane;

linear motors for linearly moving said shuttle above said surface of said base assembly along orthogonal first and second axes in a continuously variable manner;

said linear motors including means for producing magnetic fields;

said linear motor including means for carrying currents in said magnetic fields, thereby producing forces;

said first axis defining a first direction;

said second axis defining a second direction;

means for determining a position of said shuttle in said first and second directions;

said means for carrying current including coil assemblies;

said means for producing magnetic fields including a coil array having coils in a rows along said first axis and said second axis;

said coil array being positioned so as to function with said coil assemblies such that magnetic fields are produced by said coil array by means of induction due to the generation of magnetic fields by said coil assemblies, whereby the coil arrays move relative to the coil assemblies;

said linear motors including at least first, second and third linear motors;

said first, second and third linear motors including first, second and third coil assemblies, respectively, of said coil assemblies;

said first linear motor including means for producing a first force on said shuttle along said first axis; and said second and third linear motors including means for producing second and third forces at spaced-apart locations on said shuttle along said second axis whereby differential actuation thereof is effective to produce a torque on said shuttle and rotation thereof.

20. A positioning device of claim 17 wherein said means for slidably supporting include:

air bearings;

said surface of said base assembly being planar and including one of a hard flat sheet of material, a ceramic coating, and a flat surface of a base;

said surface being suitably flat for operation of said air bearing thereon; and said air bearings interfacing with said surface such that said shuttle is rotatable.

21. A positioning device comprising:

a shuttle;

a base assembly;

means for slidably supporting said shuttle in a plane above a surface of said base assembly such that said shuttle may slide in a plane;

linear motors for linearly moving said shuttle above said surface of said base assembly along orthogonal first and second axes in a continuously variable manner;

said linear motors generating forces by means of a magnetic field, acting upon a current traveling through the magnetic field;

said first axis defining a first direction;

said second axis defining a second direction;

means for determining a position of said shuttle in said first and second directions;

said linear motors including coil assemblies;

said linear motors including means for producing magnetic fields;

said means for producing magnetic fields including a coil array having coils in a rows along said first axis and said second axis;

said coil array being positioned so as to function with said coil assemblies such that magnetic fields are produced by said coil array by means of induction due to the generation of magnetic fields by said coil assemblies, whereby the coil arrays move relative to the coil assemblies;

said means for producing magnetic fields having a checkerboard coil array having coils distributed in a checkerboard pattern having rows and columns;

said rows and columns being oriented in said first and said second directions, respectively; and said checkerboard coil array being positioned so as to function with said first, second, and third coil assemblies such that magnetic fields are produced by said checkerboard coil array by means of induction due to the generation of magnetic fields by said first, second, and third coil assemblies, respectively, so that said coil arrays move relative to said coil assemblies.

22. A positioning device of claim 21 wherein said checkerboard coil array is affixed to one of said base assembly and said shuttle, and said first, second, and third coil assemblies are affixed to another one of said base assembly and said shuttle.

23. A positioning device of claim 21 wherein:
said linear motors include at least first, second and third linear motors;
said first, second and third linear motors include first, second and third coil assemblies; respectively, of said coil assemblies;
said first linear motor includes means for producing a first force on said shuttle along said first axis;
said second and third linear motors include means for producing second and third forces at spaced-apart locations on said shuttle along said second axis whereby differential actuation thereof is effective to produce a torque on said shuttle and rotation thereof.

24. A positioning device of claim 21 wherein said means for slidably supporting comprise:
air bearings;
said surface of said base assembly including one of a hard flat sheet of material, a ceramic coating, and a flat surface of a base; and
said surface being suitable for operation of said air bearing thereon.

25. A positioning device comprising:
a shuttle;
a base assembly;
means for slidably supporting said shuttle in a plane above a surface of said base assembly such that said shuttle may slide in a plane and may rotate;
linear motors for linearly moving and rotating said shuttle above said surface of said base assembly along orthogonal first and second axes;
said first axis defining a first direction;
said second axis defining a second direction;
means for determining a position of said shuttle in said first and second directions;
said means for determining a position being located at a position apart from a position of said linear motors;
a controller for driving said linear motors utilizing said means for determining a position as a source of feedback signals; and
said controller transforming coordinates of the position of the means for determining a position to transformed coordinates of a position of said linear motors and using said transformed coordinates to effect positioning of said linear motors.

26. A positioning device of claim 25 wherein said controller comprises:
means for translating said feedback signals from said means for determining a position into displacement information;
means for adjusting said displacement information to compensate for positions of said means for determining on said shuttle;
means for computing positions and orientations of said shuttle with respect to an initial reference point from said displacement information;
means for determining rates of movement and acceleration from said positions and orientations of said shuttle; and
means for selectively driving said linear motors independently so as to maintain said positions, orientations, and movement and acceleration rates at predetermined values thus moving said shuttle in a planar both linearly and rotatably.

27. A positioning device of claim 26 wherein:
said linear motors include at least first, second and third linear motors;
said first, second and third linear motors including first, second and third coil assemblies, respectively;
said first linear motor producing a first force on said shuttle along said first axis;
said second and third linear motors producing second and third forces at spaced-apart locations on said shuttle along said second axis whereby differential actuation thereof is effective to produce a torque on said shuttle.
said means for selectively driving includes means for proportionally driving said second and third linear motors so as to both rotate said shuttle and compensate for torque upon said shuttle.

28. A positioning device driven by a controller comprising:
a shuttle;
a base assembly;
means for slidably supporting said shuttle above a surface of said base assembly including one of air beatings and magnetic beatings;
at least first, second and third linear motors for linearly urging said shuttle above said surface along orthogonal first and second axes;
first, second and third coil assemblies associated with said first, second and third linear motors;
said at least three linear motors including means for producing magnetic fields normal to said surface of said base assembly and with alternating polarity along said orthogonal first and second axes;
said means for producing magnetic fields including first, second and third magnetic arrays;
said first magnetic array having magnets in a row with pole orientations alternating along said first axis;
said second and third magnetic arrays having magnets in parallel rows with pole orientations alternating along said second axis;
said first, second, and third magnetic arrays being positioned so as to function with said first, second, and third coil assemblies;
said coil assemblies and said means for producing magnetic fields being mounted such that said shuttle is moved relative to said base assembly;
said first linear motor urging said shuttle in direction of said first axis;

said second and third linear motors being separated in a direction of said first axis;

said second and third linear motors each independently urging said shuttle in a direction of said second axis that at least one of linear and rotary motion is produced;

first means for determining a position of said shuttle along said first axis; and second and third means spaced apart along a direction of said first axis for detecting positions of two positions on said shuttle along said second axis.

29. A positioning device driven by a controller comprising:

a shuttle;

a base assembly;

means for slidably supporting said shuttle above a surface of said base assembly including one of air bearings and magnetic bearings;

at least first, second and third linear motors for linearly moving and rotating said shuttle above said surface of said base assembly along orthogonal first and second axes comprising in a continuously variable manner;

at least first, second and third coil assemblies;

said first linear motor including first means for producing a first magnetic field normal to said surface of said base assembly and with alternating polarity along said first axis;

said second and third linear motors including second and third means for producing second and third magnetic fields normal to said surface with alternating polarities along said second axis;

said first, second and third means for producing magnetic fields including a checkerboard magnet array having magnets distributed in a checkerboard pattern having rows and columns;

said magnets alternating with non-magnetic spaces along both said rows and said columns of said checker board pattern;

said rows and said columns having said magnets in uniform pole orientations within each of said rows and columns;

said rows and columns alternating orientations of said uniform pole orientations thereof;

said rows and columns being oriented in directions of said first and said second axes, respectively;

said coil assemblies and said means for producing magnetic fields being mounted such that said shuttle is moved relative to said base assembly;

said first linear motor urging said shuttle in said first direction;

said second and third linear motors being separated along a direction of said first axis; and each of said second and third linear motors independently urging said shuttle in a direction of said second axis such that at least one of linear and rotary motion is produced.

30. An omni-directional linear motor comprising:

a shuttle;

a base assembly;

means for slidably supporting said shuttle above a surface of said base assembly;

linear motors for linearly moving and rotating said shuttle above said surface of said base assembly along orthogonal axis comprising:

first, second and third coil assemblies;

means for producing magnetic fields normal to said surface of said base assembly and with alternating polarity along a first and a second direction; and said first and second directions being normal to each other in a plane of the surface of said base assembly;

said means for producing magnetic fields comprising:

a checkerboard magnet array having magnets distributed in a checkerboard pattern having rows and columns;

said magnets alternating with non-magnetic spaces along both said rows and said columns of said checker board pattern;

said rows and said columns having said magnets in uniform pole orientations within each of said rows and columns;

said rows and columns alternating orientations of said uniform pole orientations thereof;

said rows and columns being oriented in said first and said second directions, respectively;

said coil assemblies and said means for producing magnetic fields being mounted such that said shuttle is movable relative to said base assembly;

said first coil assembly urging said shuttle in said first direction;

said second and a third coil assemblies being separated along an axis in the first direction; and said second and third coil assemblies each independently urging said shuttle in said second direction such that at least one of linear and rotary motion is produced.

31. A positioning device comprising:

a shuttle;

a base assembly;

means for slidably supporting said shuttle in a plane above a surface of said base assembly such that said shuttle may slide in a plane;

linear motors for linearly moving said shuttle above said surface of said base assembly along orthogonal first and second axes in a continuously variable manner;

said linear motors generating forces by means of a magnetic field, produced by magnets, acting upon a current traveling through the magnetic field;

said first axis defining a first direction;

said second axis defining a second direction;

said linear motors including a first magnetic array having magnets in a row with pole orientations alternating in a direction of said first axis; and said linear motors including second and third magnetic arrays, respectively, each having magnets in a row with pole orientations alternating in a direction of said second axis.

* * * * *